United States Patent [19]

Jaggar

[11] Patent Number: 5,748,518
[45] Date of Patent: May 5, 1998

[54] DATA PROCESSING DIVIDER

[75] Inventor: David Vivian Jaggar, Cherry Hinton, United Kingdom

[73] Assignee: Advanced Risc Machines Limited, Cherry Hinton, United Kingdom

[21] Appl. No.: 510,712

[22] Filed: Aug. 3, 1995

[30] Foreign Application Priority Data

Dec. 21, 1994 [GB] United Kingdom ............... 9425786

[51] Int. Cl.$^6$ ............................ G06F 7/52; G06F 9/302
[52] U.S. Cl. ............................... 364/764; 395/562
[58] Field of Search .......................... 364/761, 764; 395/375, 562, 563, 588, 385

[56] References Cited

U.S. PATENT DOCUMENTS

| | | | |
|---|---|---|---|
| 4,065,666 | 12/1977 | Wu | 364/759 |
| 4,224,676 | 9/1980 | Appelt | 364/712 |
| 4,555,768 | 11/1985 | Lewis, Jr. et al. | 364/757 |
| 4,725,974 | 2/1988 | Kanazawa | 364/765 |
| 4,860,241 | 8/1989 | Haber | 364/761 |
| 4,872,214 | 10/1989 | Zurawski | 364/766 |
| 4,881,193 | 11/1989 | Hamada et al. | 364/761 |
| 4,916,531 | 4/1990 | Genz et al. | 358/530 |
| 5,206,826 | 4/1993 | Mori et al. | 364/748 |
| 5,262,973 | 11/1993 | Richardon | 364/736 |
| 5,274,777 | 12/1993 | Kawata | 395/394 |
| 5,309,383 | 5/1994 | Kuroiwa | 364/748 |
| 5,442,581 | 8/1995 | Poland | 364/764 |
| 5,522,084 | 5/1996 | Ando | 395/800 |
| 5,611,029 | 3/1997 | Watters et al. | 395/131 |

FOREIGN PATENT DOCUMENTS

0 258 051 A2    3/1988    European Pat. Off. .

*Primary Examiner*—Reba I. Elmore
*Assistant Examiner*—Robert J. Dolan
*Attorney, Agent, or Firm*—Fenwick & West LLP

[57] ABSTRACT

A microprocessor is described having an arithmetic unit 8 that includes a dedicated hardware divider. The hardware divider is responsive to a plurality of different divide instruction codes to generate respective multi-bit portions of a quotient. Each divide instruction can be early terminated when the partial remainder is detected as being zero. Furthermore, subsequent divide instructions to calculate the remaining bits of the quotient can be skipped in response to a flag (Zflag) set within a current programming status register 28. In the described embodiment, a 32-bit divisor and 64-bit dividend serve to produce a 32-bit quotient and a 32-bit remainder. The generation of the 32-bit quotient takes place in response to four different divide instruction codes each responsible for generating a respective 8-bit portion of the quotient.

13 Claims, 8 Drawing Sheets

DATA PROCESSING DIVIDER

BACKGROUND OF THE INVENTION

1. Field of the Invention

This invention relates to the field of data processing. More particularly, this invention relates to data processing systems having a dedicated hardware divider circuit.

2. Description of the Prior Art

It is known to provide data processing systems with dedicated hardware for performing integer divide operations. The complexity of implementing divide operations in hardware is such that it is usual to only usefully produce one bit of quotient per processing cycle. Accordingly, on a 32-bit system, a 32-bit division operation would typically take 32 clock cycles to complete. This number of cycles compares unfavourably with most other processing operations that might typically take one to five processing cycles to complete. This is particularly the case in reduced instruction set computing systems in which efforts are made to keep the number of cycles taken to execute each instruction to as low a value as possible.

One problem of such long execution times is an undesirably long interrupt latency. If a processing exception occurs requiring that control should be passed to an exception handling routine, then the system must wait until the currently executing instruction has completed before processing may be safely diverted to the exception handling routine. The need to wait until the currently executing instruction has completed results from the requirement to ensure data integrity by stopping the processor in a known condition. In the case of a divide instruction taking perhaps 32 cycles to complete, the need to wait up to 32 cycles before the exception processing may commence is a significant system limitation.

It has been previously proposed that this problem may be dealt with by providing a separate instruction to calculate each bit of a quotient. Thus, in order to calculate a 32-bit quotient value, 32 instructions would have to be consecutively executed. Whilst this approach reduces the interrupt latency to that needed to read the input operands, calculate one bit of quotient and write the output results, it represents a significant increase in the size of the program software concerned. Accordingly, this approach is unsatisfactory in situations where code density is important. In addition, the read and write operations after each instruction increase the total time needed to produce the full 32-bit quotient.

Another problem with such integer divide operations is the relatively high number of operands required. Consider the case of a 32-bit divisor and a 64-bit dividend resulting in a 64-bit quotient with a 32-bit remainder being left in the least significant dividend register. In this case, five 32 operands are required, one for each instruction code (one for the divisor, two for the dividend and two for the quotient). This situation would require five register access ports if it were to be accomplished in a single cycle. This is more register access ports than are usually provided within a system.

One way to deal with this restriction upon the number of register access ports would be to take more than one cycle in which to perform the register access operations at the beginning and end of a divide instruction. In this way, the register access ports are used as many times as needed to read out the operands. Whilst overcoming the requirement for such a large number of operands, this solution has the disadvantage of increasing the total time needed to execute a divide instruction. This is particularly significant in the case of the approach to reducing interrupt latency by calculating only one bit of quotient on each cycle since register accesses would be required at the beginning and at the end of each instruction code operation.

Another approach to the problem of the large number of operands required would be to add a separate divisor/quotient register to reduce the number of ports required in the main register file. Whilst superficially attractive, this approach causes problems in superscaler arithmetic logic design because the separate divisor/quotient register is a single resource upon which each arithmetic logic unit will rely. Accordingly, such an arrangement may lead to an undesirable restriction in processing speed.

SUMMARY OF THE INVENTION

Viewed from one aspect this invention provides apparatus for processing data in response to instruction codes, said apparatus comprising:

a dedicated divider circuit responsive to a plurality of different divide instruction codes to generate respective multi-bit portions of an X-bit quotient.

The invention recognises that if a plurality of different divide instruction codes are provided each generating a respective multi-bit portion of a quotient, that the interrupt latency may be reduced whilst the penalty of having to make extra register access operations at the start and end of each of the divide instruction codes does not become too large.

In a system having an X-bit quotient, Y-dividend and Z-bit divisor stored in respective registers of a register bank, it is advantageous that one or more registers initially storing said Y-bit dividend serve to store a Y-bit remainder as generation of said X-bit quotient progresses.

In this way, the total number of registers required as resources to the divide instruction codes is reduced. Furthermore, this arrangement is particularly suitable for dedicated divider circuits which progress the divide operation by subtracting multiples of the divisor from the dividend; these can be made to ultimately result in the remainder result for the full division operation being left within the registers that were storing the dividend.

In a system in which the quotient and the dividend are 64 bits in length and the divisor is 32 bits in length, it is particularly suitable that the multi-bit portions should comprise 8-bit portions.

Another significant advantage of the invention is that by breaking up execution of a required divide operation into several multi-bit portions, the execution may be early terminated if the dividend value becomes zero during the execution. This increases overall the processing speed.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
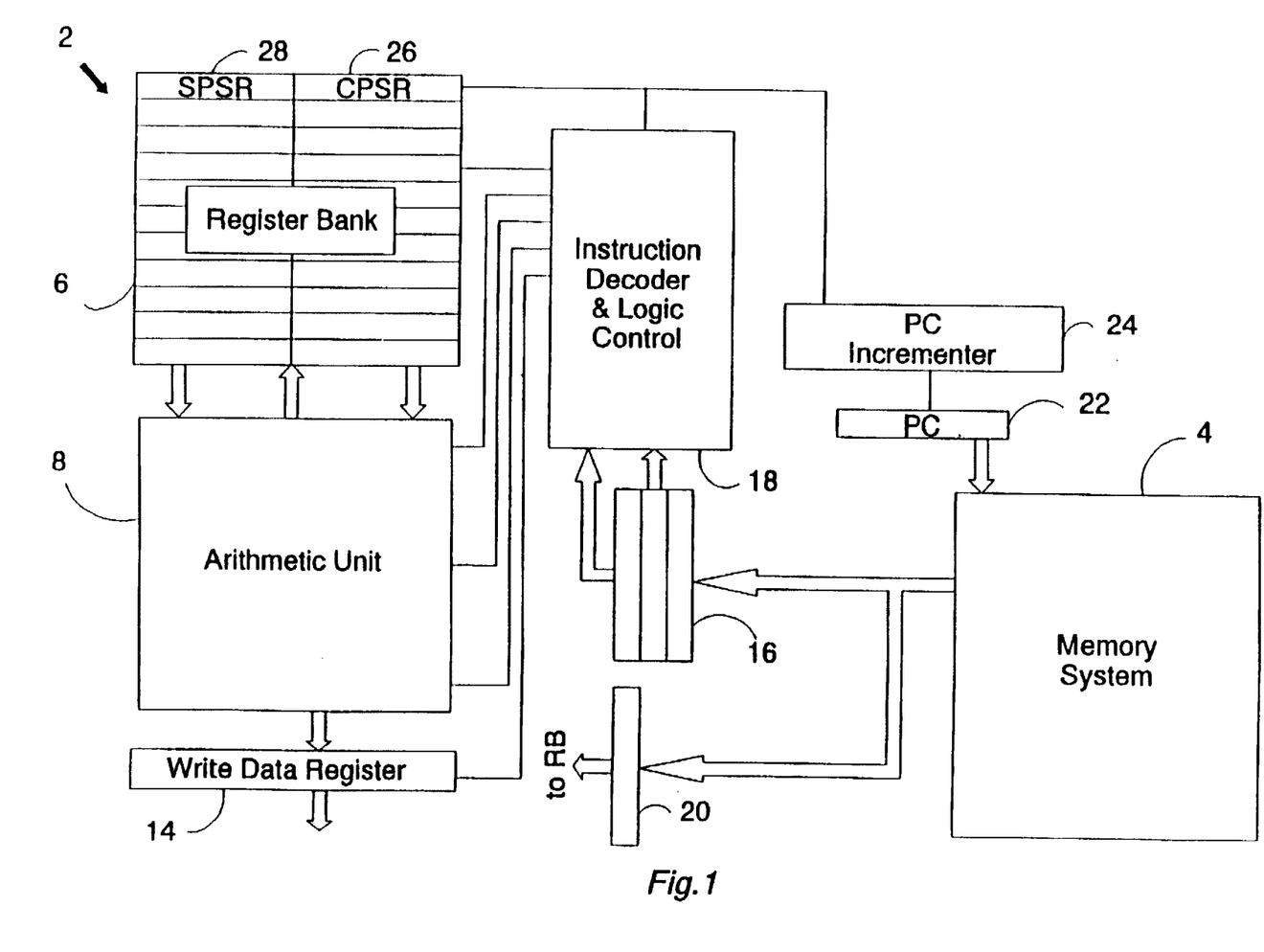
FIG. 1 illustrates a data processing system in the form of an integrated circuit microprocessor.

FIG. 1 illustrates a data processing system (that is formed as part of an integrated circuit) comprising a processor core 2 coupled to a memory system 4.

The processor core 2 includes a register bank 6, an arithmetic unit 8 and a write data register 14. Interposed between the processor core 2 and the memory system 4 is an instruction pipeline 16, an instruction decoder 18 and a read data register 20. A program counter register 22, which is part of the processor core 2, is shown addressing the memory system 4. A program counter incrementer 24 serves to increment the program counter value within the program counter register 22 as each instruction is executed and a new instruction must be fetched for the instruction pipeline 16.

The processor core 2 incorporates N-bit data pathways (in this case 32-bit data pathways) between the various functional units. In operation, instructions within the instruction pipeline 16 are decoded by the instruction decoder 18 which produces various core control signals that are passed to the different functional elements within the processor core 2. In response to these core control signals, the different portions of the processor core 2 conduct 32-bit processing operations, such as 32-bit multiplication, 32-bit addition, multiplyaccumulate operations of differing precisions and 32-bit logical operations.

The register bank 6 includes a current programming status register 26 and a saved programming status register 28. The current programming status register 26 holds various condition and status flags for the processor core 2. These flags may include processing mode flags (e.g. system mode, user mode, memory abort mode etc.) as well as flags indicating the occurrence of zero results in arithmetic operations, carries and the like. These flags control the conditional execution of program instructions in dependence upon the parameters specified by the condition codes of the first four bits of each instructions. The saved programming status register 28 (which may be one of a banked plurality of such saved programming status registers) is used to temporarily store the contents of the current programming status register 26 if an exception occurs that triggers a processing mode switch. In this way, exception handling can be made faster and more efficient.

The register bank 6 has two read ports and one write port. The write port is able to operate twice in one processing cycle, whereas the read ports are only able to operate once in one processing cycle.

Once the required program instruction words have been recovered from the memory system 4, they are decoded by the instruction decoder 18 and initiate 32-bit processing within the processor core 2.

Figure 2:
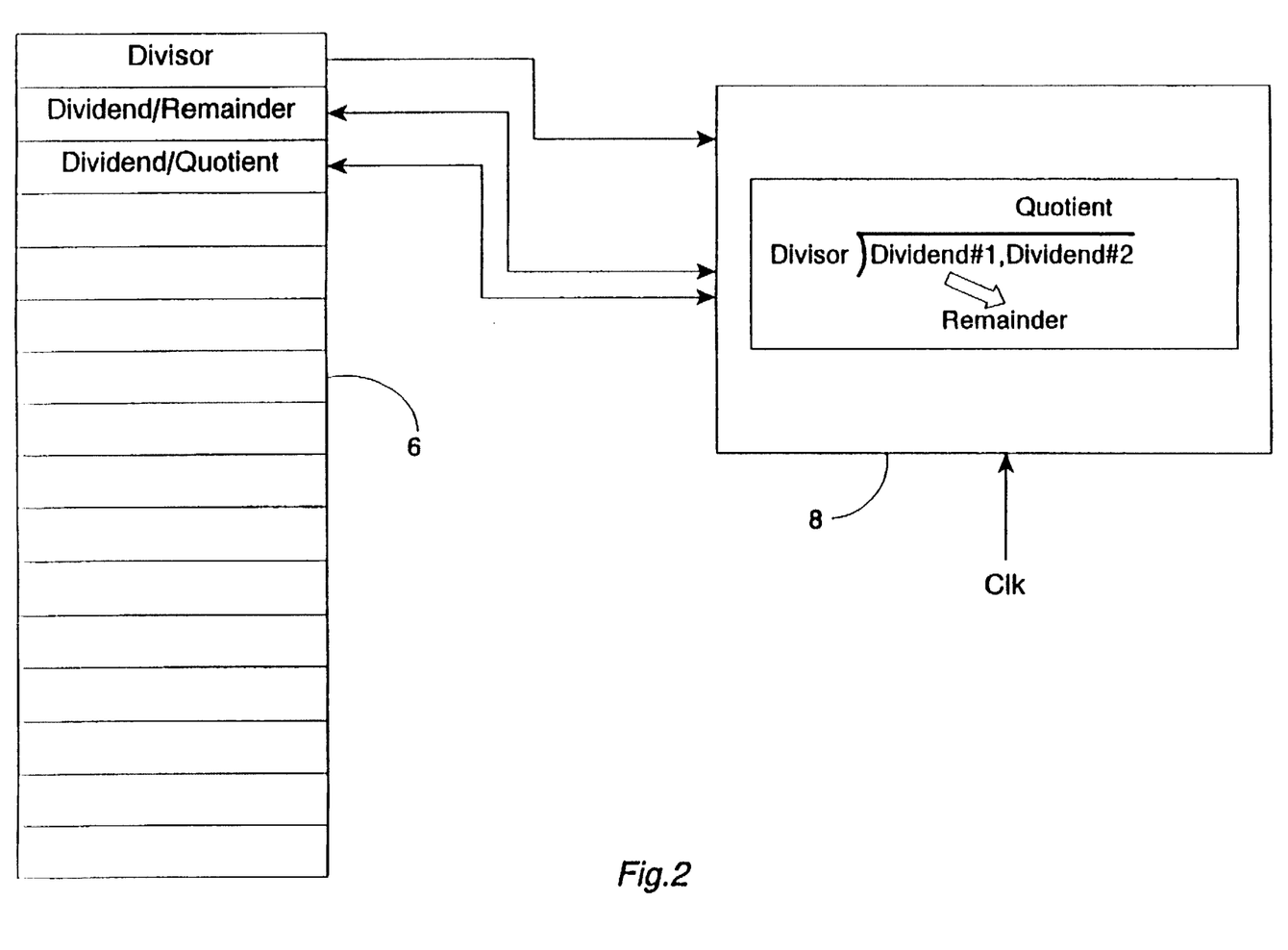
FIG. 2 schematically illustrates the data values transferred between a register bank and an arithmetic unit.

FIG. 2 schematically illustrates the reading and writing of registers from the register bank 6 to and from the arithmetic unit 8. Considered as a whole, a division operation utilising a 32-bit divisor and a 64-bit dividend produces a 32-bit quotient and a 32-bit remainder. As a result of the nature of the division operation (to be discussed later), the quotient and the remainder overlie the most significant portion and least significant portion of the dividend after completion of the full operation. Three register reads need to take place to read the divisor and the two parts of the dividend at the beginning of the divide operation. Following the divide operation, two writes need to take place to store the quotient and the remainder back in the register bank 6. Since the read ports can only perform one read operation per cycle, two cycles are needed to perform the three register reads, whereas a single cycle can perform the two necessary register writes.

Figure 3A:
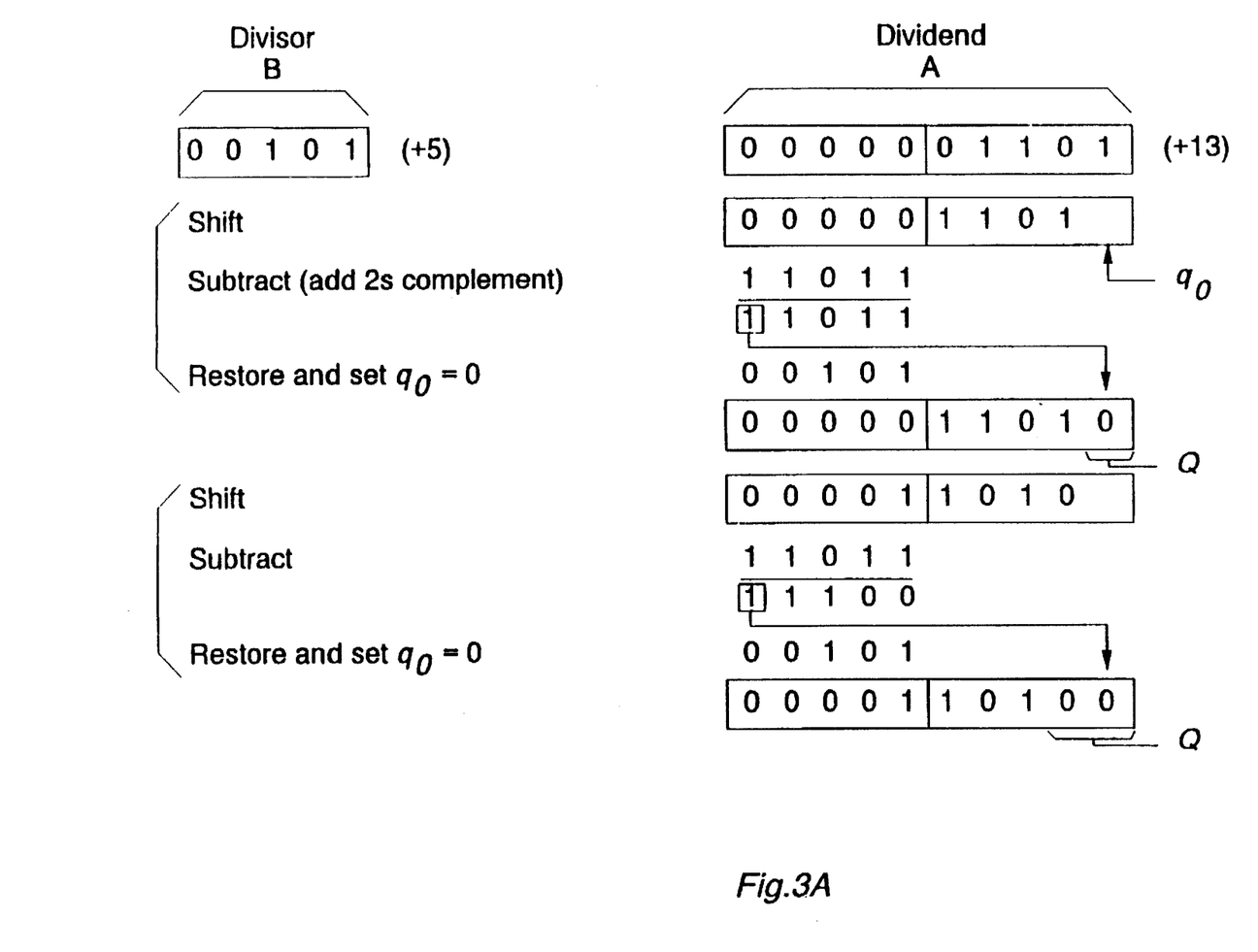
FIGS. 3A and 3B show a first example shift-subtract-restore division operation.
Figure 3B:
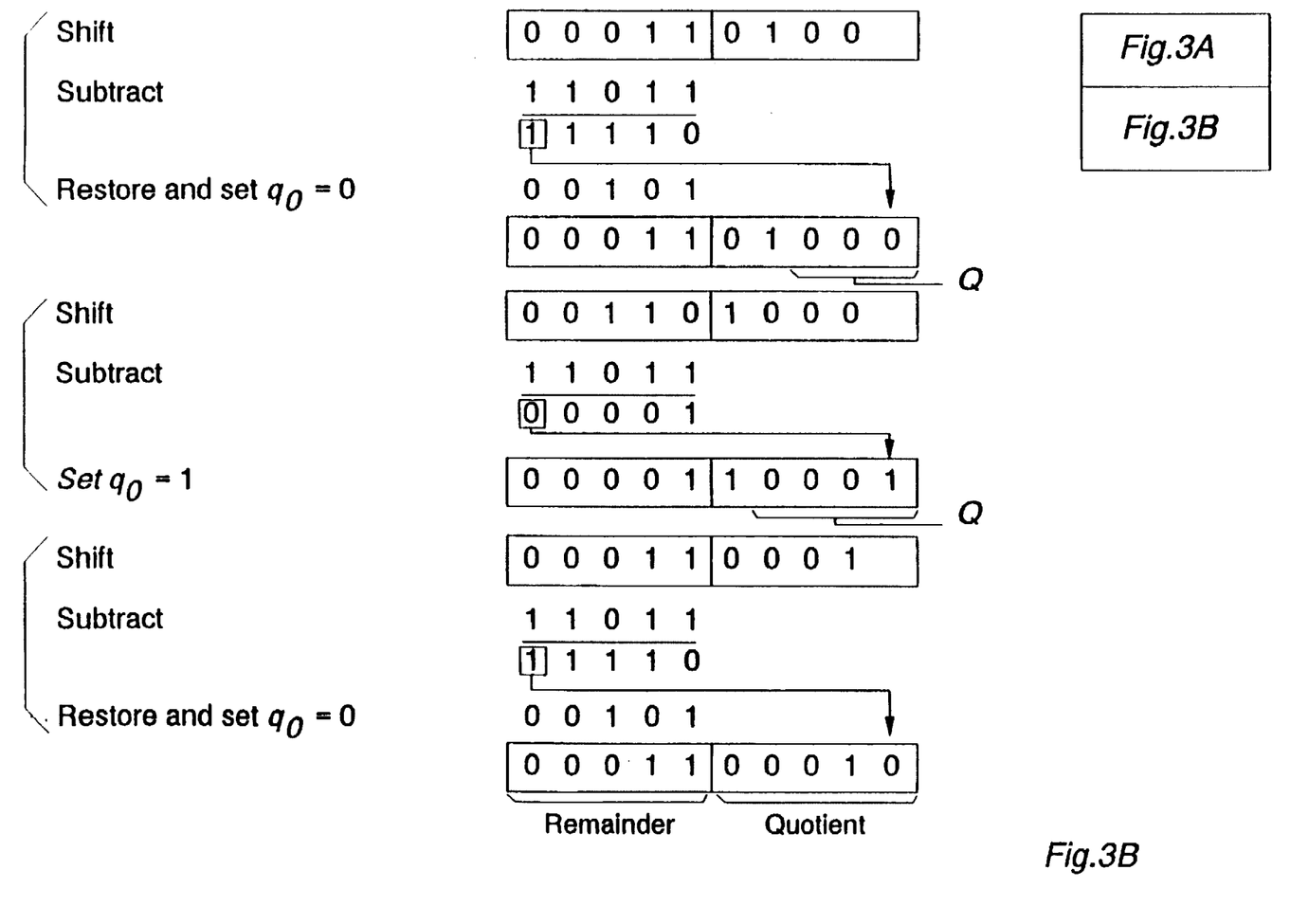

FIGS. 3A and 3B illustrate the hardware technique used to achieve binary division. In this example, the dividend A is +13 and the divisor B is +5. Broadly speaking, the division process proceeds by left-shifting the dividend A and then subtracting the divisor B from the most significant half of the shifted dividend A. This subtraction is achieved by adding the 2s complement of the divisor B.

If the result of the subtraction is negative (indicated by the most significant bit of the result being a 1), then the divisor B is larger than the most significant half of the dividend A and the quotient bit for that cycle is set to a 0. In contrast, if the result of the subtraction result is positive (indicated by the most significant bit of the result being a 0), then the most significant half of the dividend A is larger than the divisor B and the quotient bit for that cycle is set to a 1.

In the case where the result of the subtraction is negative and the quotient bit is a 0, the most significant half of the shifted dividend A is restored to its value prior to the subtraction at the end of the cycle. Upon the next cycle, the left shifted dividend A will have a numerically larger most significant half and so the possibility that it will be greater than the divisor B is increased. In contrast, when the result of the subtraction is positive and the quotient bit is a 1, then the most significant half of the shifted dividend A is not restored at the end of the cycle and a new partial remainder becomes current.

As will be seen from the example of FIGS. 3A and 3B, at the end of the final division cycle, the uppermost half of the registers that initially held the dividend A, now holds the remainder of the division operation with the least significant half of these registers holding the quotient. In the case of a dividend A of +13 and divisor B of +5, the quotient is +2 and the remainder is +3.

Figure 4A:
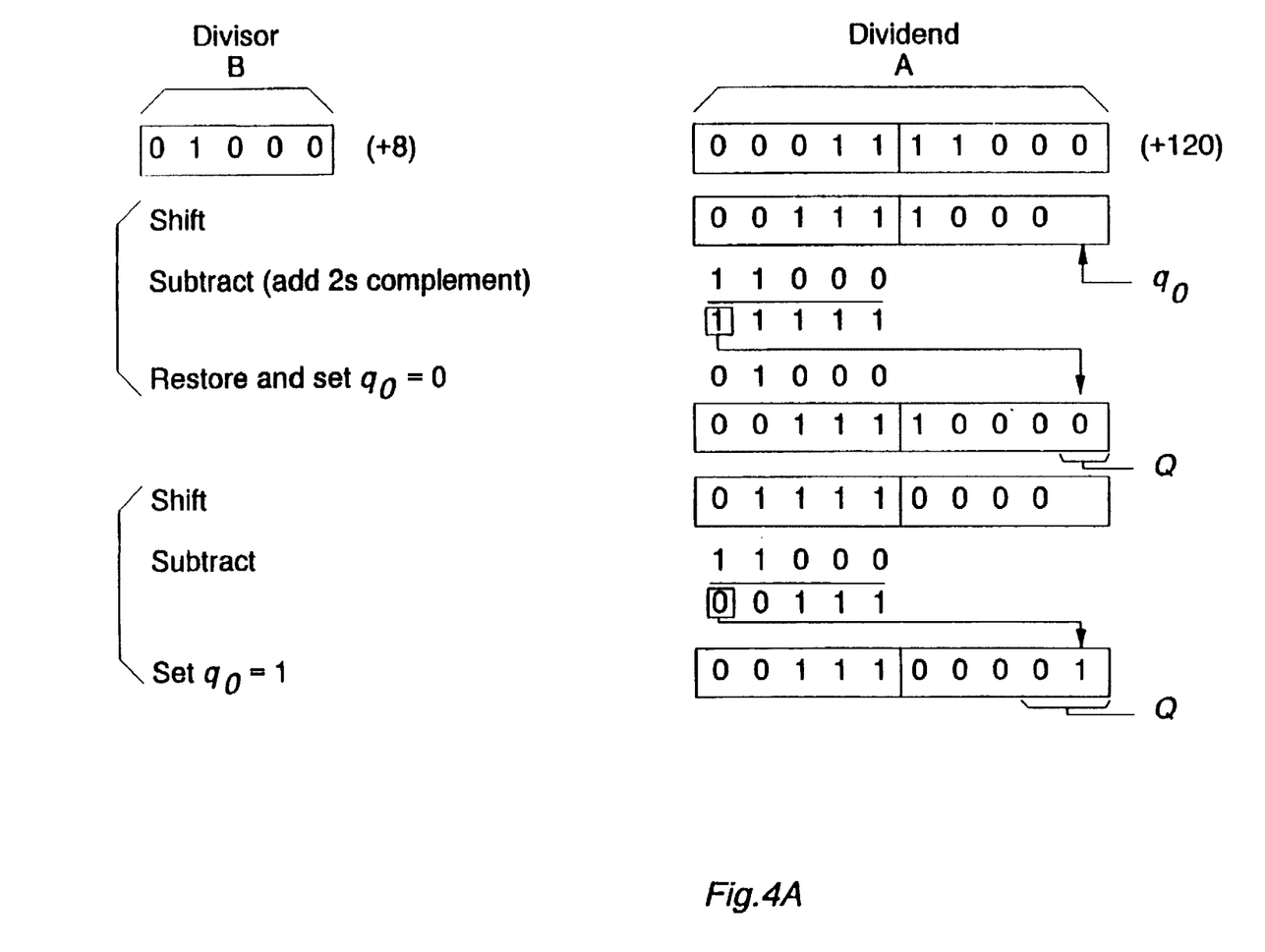
FIGS. 4A and 4B show a second example shift-subtract-restore division operation.
Figure 4B:
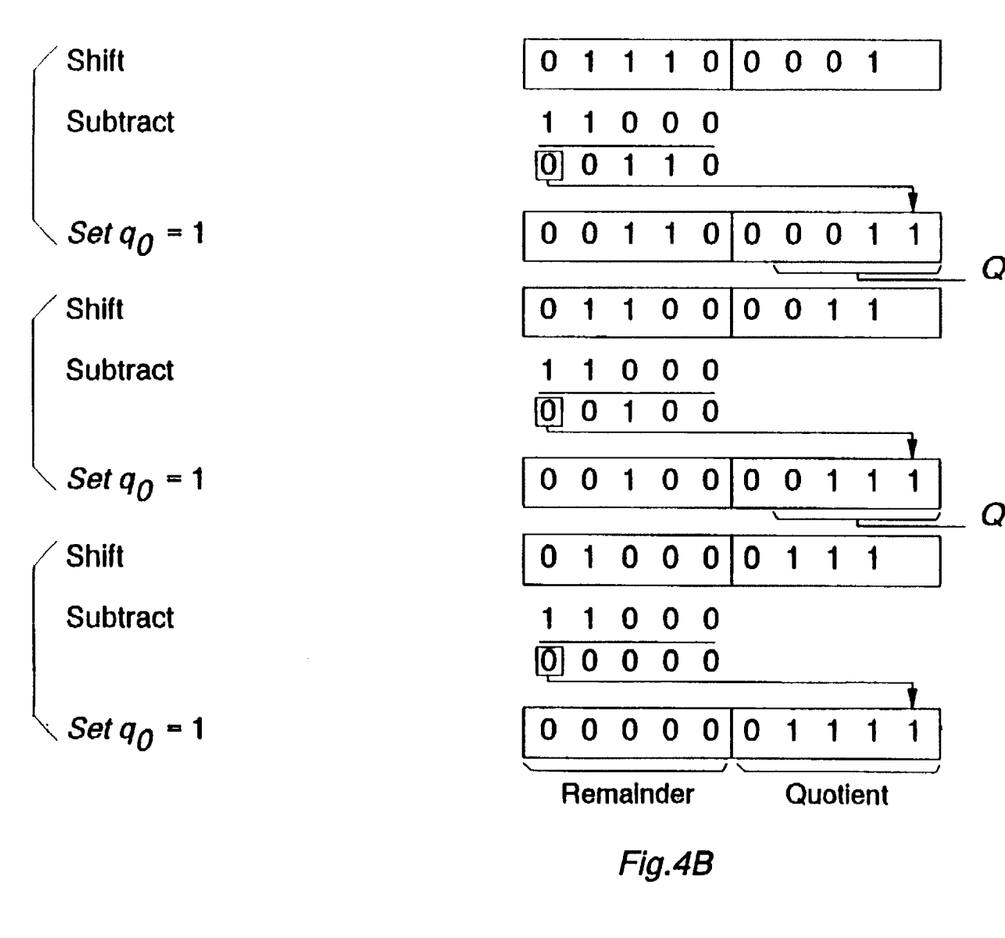

FIGS. 4A and 4B illustrate another example of this hardware division technique in operation. In this case, the dividend A is +120 and the divisor B is +8. The result of this division is a quotient of +15 and a remainder of a 0. A restore and set quotient bit equal to 0 step occurs on the first cycle. The remaining four cycles have no restore operation and each set their respective quotient bit to a 1.

It will be appreciated that with this type of division a check must be made for a divide overflow. A divide overflow occurs when the most significant half of the unshifted dividend A is greater than the divisor B. In this case, there will be an insufficient number of bits in the least significant half of the registers initially holding the dividend A to properly represent the quotient. Accordingly, the divide operation should not be allowed to proceed. The overflow check is made before the divide operation commences by subtracting the divisor B from the most significant half of the unshifted dividend A and triggering an overflow error if the result is positive.

Figure 5:
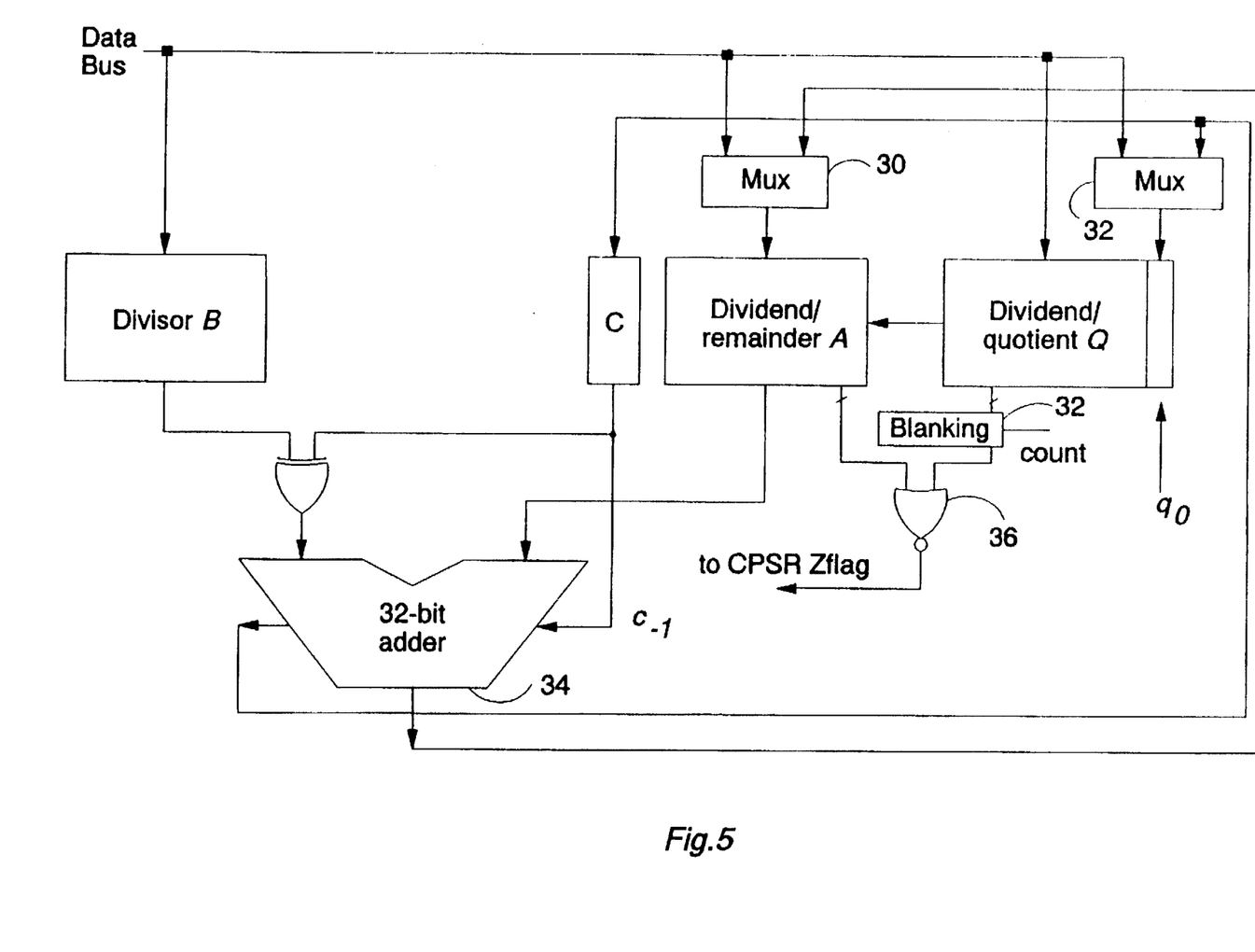
FIG. 5 shows a hardware divider.

FIG. 5 shows schematically the hardware required for an integer divide operation. A 64-bit dividend is loaded into the concatenated registers A and Q, with register A containing the high order 32 bits and register Q containing the low order 32 bits. A 32-bit positive divisor is loaded into register B, and the carry flip-flop is set to 1. The dividend is shifted to the left by one bit position, and the divisor is subtracted by adding its negated value. The information about the relative magnitudes is then available in the carry flip-flop C. If C=1, then this signifies that A≧B, and a quotient bit of 1 is inserted into the $q_o$ position. The partial remainder is then shifted to the left and the process is repeated. If C=0, then this signifies that A<B, and a quotient bit of 0 is inserted into the $q_o$ position (the value set into $q_o$ could also be loaded during the shift). The value of B is then added to restore the partial remainder in A to its previous value and the carry flip-flop is set to 1. The partial remainder is then shifted to the left and the process repeats until all of the desired bits of the quotient have been formed.

The overall operation of the hardware divide unit will be seen to tend to decrease the initial partial remainder from 64 bits to 32 bits and, at the same time, increase the quotient to 32 bits. The 32-bit quotient enters the cascaded registers from the right and pushes the upper part of the partial remainder (initially the dividend) off to the left end of the concatenated registers A and Q. The divisor register B is required only to load information (from the data bus); it is not required to have shift properties in the same manner as registers A and Q.

Figure 6:
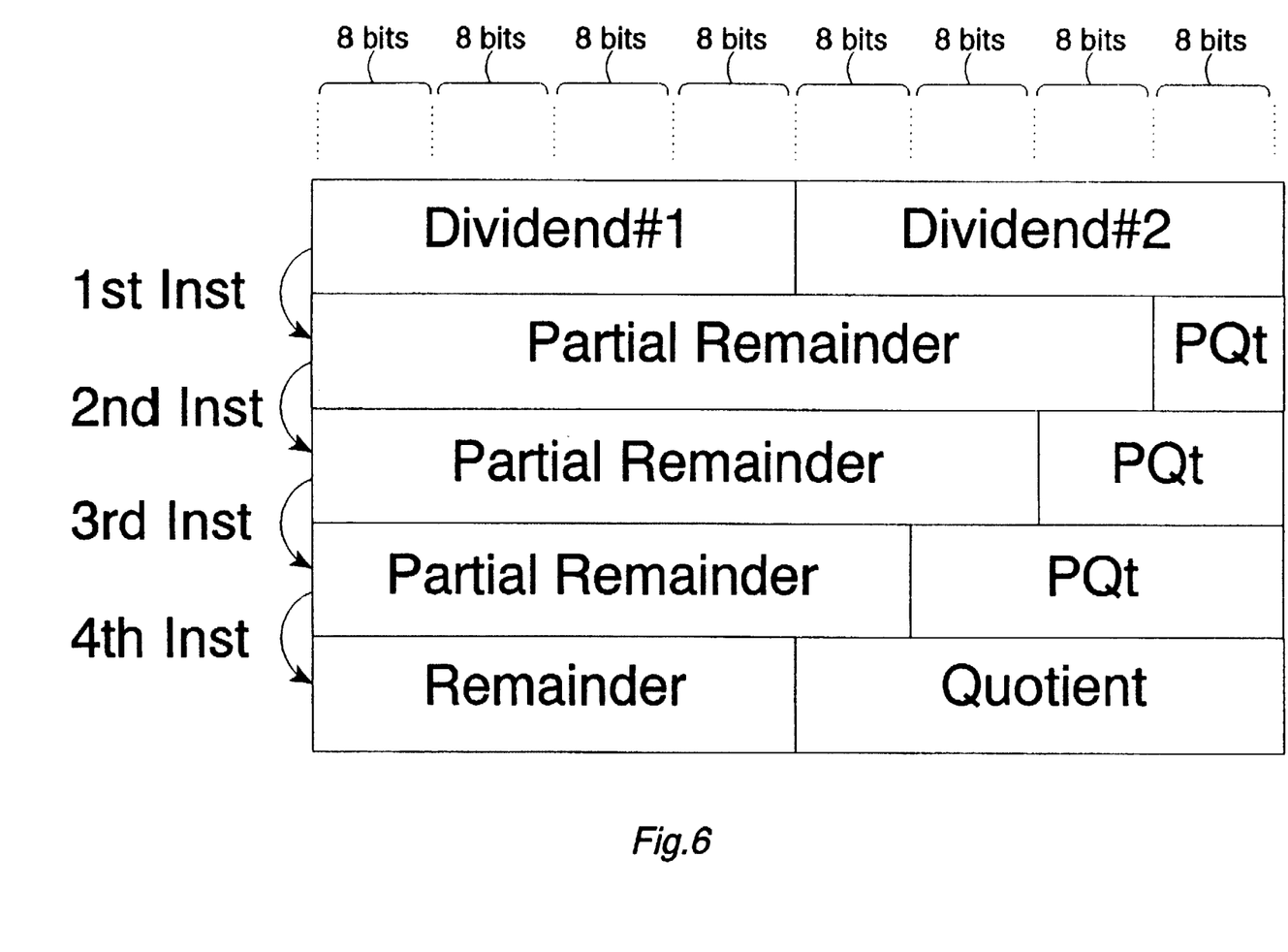
FIG. 6 schematically illustrates the operations performing in response to differing divide instructions.

FIG. 6 illustrates the manner in which the generation of a full 32-bit quotient is split down to be achieved by four successive divide instructions. The first instruction generates the highest order 8 bits of the quotient as a partial quotient (PQt) starting from the 64-bit dividend (Dividend#1, Dividend#2). The 8-bit partial quotient following the first instruction is accompanied by a 56-bit partial remainder. The second instruction has as its inputs to the registers A and Q the result of the first instruction, i.e. a 56-bit partial remainder and a 8-bit partial quotient. The second instruction then proceeds to calculate the next 8 bits of the quotient by shift, subtract and restore operations as previously discussed. At the end of the second instruction, the registers A and Q contain a 48-bit partial remainder and a 16-bit partial quotient.

The third instruction continues in an analogous manner to the first and second instructions and results in a 40-bit partial remainder and a 24-bit partial quotient.

The final divide instruction, the fourth instruction, takes as its input a 40-bit partial remainder and a 24-bit partial quotient and serves to generate the final desired 32-bit remainder and the 32-bit quotient. The remainder and quotient are respectively held within the registers A and Q.

Returning to FIG. 5, at the start of each instruction, the divisor is loaded into register B and the dividend partial remainder and partial quotient operands are loaded into the registers A and Q. The multiplexer 30 serves to select the value for input to the register A and the multiplexer 32 selects the value for input to register Q. During the shift, subtract and restore cycles of the divide operation, the multiplexer 32 serves to selectively feed the carry bit from the 32-bit adder 34 performing the subtract operation into the lowest order bit $q_o$ of the register Q. At the same time, the multiplexer 30 serves to select into the register A the output of the 32-bit adder 34 for those cycles in which the divisor stored in the register B is less than the current partial remainder corresponding to a quotient bit of 1 and a new partial remainder value; otherwise the value stored in the register A is not changed.

As previously mentioned, the invention serves to enhance the possibilities for early termination. More particularly, a 64-input NOR gate 36 serves to monitor the current value of the partial remainder as the division operation proceeds. If the partial remainder reaches a value of 0, then no further shift, subtract and restore operations are needed in order to arrive at the final result, all of the quotient bits of lower order than those already calculated will be equal to 0. In this case, to produce the final quotient value, the partial quotient (PQt) needs to be left shifted by a number of positions equal to the as yet uncalculated quotient bits, with 0 quotient bits being fed into the lower order positions. In order that the NOR gate 36 responds only to the partial remainder bits within the registers A and Q, a blanking circuit 38 is interposed between the register Q and the NOR gate 36. The blanking circuit progressively blocks the passage of bit values from the register Q to the NOR gate 36 that correspond to positions now occupied by the partial remainder (PQt). Low bit inputs blocked by the blanking circuit 38 are supplied with 0 values so as not to interfere with the action of NOR gate 36 in detecting the partial remainder becoming 0 at all of its valid bit positions.

When the NOR gate 36 detects that the partial remainder is 0, a signal is issued to set the zero result flag (Zflag) within the CPSR register 36. The partial quotient is then left shifted by the appropriate amount to align it with the final 32-bit quotient. The divide instructions are conditional instructions whose conditional flags indicate that they should be skipped if the zero flag (Zflag) within the CPSR register 26 is set. Conditional instructions sets operating in this way are known from microprocessors such as the ARM6 microprocessor produced by Advanced RISC Machines Limited. Alternatively, on standard architecture system, conditional branch instructions between divide instructions could be used to early terminate.

The instruction decoder and logic control unit 18 illustrated in FIG. 1 serves as a means for interrupting data processing between adjacent divide instructions in dependence upon the partial remainder value. In the above example, the multi-bit portions of the quotient that are calculated, one for each divide instruction, are 8-bit portions. These multi-bit portions could have another size in dependence upon the appropriate trade-off between interrupt latency and code density.

It will also be appreciated that the divider hardware illustrated in FIG. 5 is only one example of the hardware that may be used. Different divider hardware may be utilised and yet still benefit from the advantage of having a plurality of divide instructions each responsible for generating a respective multi-bit portion of the quotient. A number of different divider hardware implementations are known in the art. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data in response to instruction codes, said apparatus comprising:
    a dedicated divider circuit responsive to a plurality of different divide instruction codes received from an instruction decoder to generate respective multi-bit portions of an X-bit quotient from a Y-bit dividend and a Z-bit divisor, each different divide instruction code corresponding to a respective different multi-bit portion of said X-bit quotient.

2. Apparatus as claimed in claim 1, wherein said apparatus comprises an integrated circuit microprocessor.

3. Apparatus as claimed in claim 1 comprising a register bank having a plurality of registers, respective registers storing said X-bit quotient, said Y-bit dividend and said Z-bit divisor.

4. Apparatus as claimed in claim 3, wherein one or more registers initially storing said Y-bit dividend serve to store a Y-bit remainder as generation of said X-bit quotient progresses.

5. Apparatus as claimed in claim 3, wherein each of said registers stores N bits, $X=n_x * N$, $Y=n_y * N$ and $Z=n_z * N$, and $n_x$, $n_y$ and $n_z$ being integers.

6. Apparatus as claimed in claim 5, wherein said register bank has three data paths allowing simultaneous access to respective registers.

7. Apparatus as claimed in claim 1, wherein said X-bit quotient comprises $n_{mbp}$ of said multi-bit portions, $n_{mbp}$ being an integer and said multi-bit portions being non-overlapping.

8. Apparatus as claimed in claim 1, wherein said multi-bit portions comprises 8-bit portions.

9. Apparatus as claimed in claim 1, wherein X=Y=64 and Z=32.

10. Apparatus as claimed in claim 1, comprising means for interrupting data processing, said means for interrupting being operable between adjacent divide instruction codes.

11. Apparatus as claimed in claim 1, comprising means responsive to an initial dividend value for a divide instruction code, said means for skipping execution of said instruction code if said initial dividend value is zero.

12. Apparatus as claimed in claim 11, wherein said divide instruction codes include a conditional execution field with a flag indicating that execution should be skipped if said initial dividend value is zero.

13. A method of processing data in response to instruction codes, said method comprising the steps of:

in response to receiving a plurality of different divide instruction codes from an instruction decoder, generating respective multi-bit portions of an X-bit quotient from a Y-bit dividend and a Z-bit divisor using a dedicated divider circuit, each different divide instruction code corresponding to a respective different multi-bit portion of said X-bit quotient.

\* \* \* \* \*